United States Patent [19]

Reckard

[11] 4,004,193
[45] Jan. 18, 1977

[54] VOLTAGE SURGE ARRESTER WITH CAPACITIVE GRADING AND IMPROVED SPARKOVER FOR FAST IMPULSES

[75] Inventor: Ronald M. Reckard, Pittsfield, Mass.

[73] Assignee: General Electric Company

[22] Filed: Mar. 17, 1975

[21] Appl. No.: 558,789

[52] U.S. Cl. .................................. 317/70; 317/68
[51] Int. Cl.² ........................................ H02H 3/22
[58] Field of Search ................ 317/70, 61, 62, 68; 315/35, 36, 189

[56] References Cited
UNITED STATES PATENTS

| 3,348,100 | 10/1967 | Kresge | 317/70 |
| 3,418,530 | 12/1968 | Cheever | 317/70 X |
| 3,510,726 | 5/1970 | Harder | 317/62 X |
| 3,518,492 | 6/1970 | Kresge et al. | 317/70 X |
| 3,611,044 | 10/1971 | Osterhout et al. | 317/70 |
| 3,683,234 | 8/1972 | Rodewald | 315/189 X |

Primary Examiner—William M. Shoop
Assistant Examiner—Patrick R. Salce
Attorney, Agent, or Firm—Volker R. Ulbrich

[57] ABSTRACT

The arrester includes a plurality of gap units and nonlinear resistance valve units connected in series between the line voltage and ground. A series line of capacitors across the gap units provides capacitive grading for fast high frequency impulses. A series line of resistors across the gap units provides resistive grading for slow, low frequency impulses. The gap units comprise control gap units for controlling the initial sparkover of the arrester and cascade gap units. The control gap units all have substantially equal sparkover voltages for slow impulses. The improvement comrises that there is connected across at least one of the control gap units and in series with the series line of capacitors, a linear upset resistor having a resistance chosen so that the time constant of the resistor and capacitive grading line is about 0.25 microseconds.

3 Claims, 1 Drawing Figure

VOLTAGE SURGE ARRESTER WITH CAPACITIVE GRADING AND IMPROVED SPARKOVER FOR FAST IMPULSES

BACKGROUND OF THE INVENTION

The present invention relates generally to overvoltage surge arresters for use at relatively high voltages and particularly to, but not necessarily exclusively to, such arresters for use with direct current power systems.

Overvoltage surge arresters protect the insulation of an electrical system from exposure to excessive voltages by selectively grounding the system to drain off current in such a way that an overvoltage surge in the system becomes attenuated. As electrical systems become more complex and more costly, the performance characteristics of such arresters become increasingly important. This is especially true for direct current systems which can, as one of their advantages, minimize the amount of insulation required for the components.

An arrester for high voltage operation typically includes both control gap units and cascade gap units. The control gap units differ from the cascade gap units primarily in that they have both a substantially lower sparkover voltage level and also are more accurately calibrated for their sparkover level and over a wider frequency range. Both the lower sparkover and the accuracy can be provided, for instance, by a preionizer and triggering gap associated with the power gap of the unit. The power gaps of the cascade gap units, on the other hand, typically have associated with them only a simple preionizer and are designed to have optimum sparkover characteristics for the relatively well defined internal impulse of the arrester. Thus, the control gap units always spark over before any of the cascade gap units spark over, and any one of the control gaps can be the first gap to trigger a sparkover when the arrester is subjected to a surge.

An increasingly important characteristic of arresters is the response time of the arrester to the steep wave front of a fast overvoltage impulse, such as might be generated by a lightning stroke directly to a component of the system. If the response of the arrester is not sufficiently rapid, the impulse will cause damage to insulation in the system before the arrester gaps have sparked over. The first control gap unit to spark over largely determines the response to an impulse.

A persistent problem with shortening the sparkover time of an arrester has been that in general, the sparkover voltage of a given gap is not completely independent of the time of response to the voltage. Thus, if a control gap unit having a certain sparkover voltage for a relatively slow impulse, such as a switching surge, is subjected to the steep front of a fast voltage impulse, the sparkover of the control gap unit will be at a somewhat higher voltage. This characteristic called impulse turn-up, can result in insulation damage to the system.

SUMMARY OF THE INVENTION

In the novel arrester there is connected in series with the capacitive grading line, and in parallel with at least one of the control gap units in the arrester, an upset resistor. The upset resistor permits reduction of the sparkover for fast impulses without a corresponding reduction of the sparkover voltage for slow impulses.

DESCRIPTION OF THE PREFERRED EMBODIMENT

Figure 1:
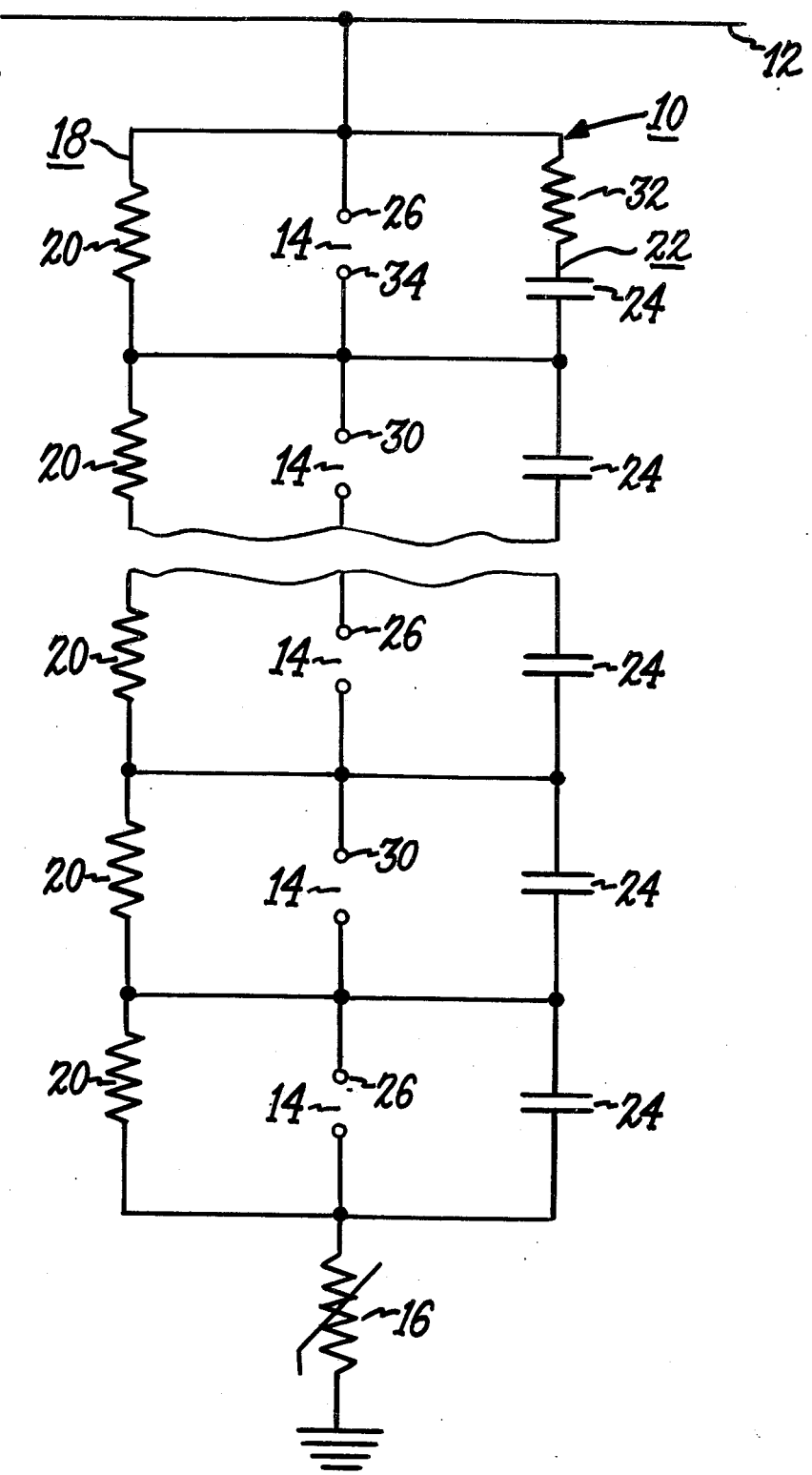
FIG. 1 is a schematic diagram of an arrester in accordance with a preferred embodiment of the invention.

A preferred embodiment of the invention is the arrester 10 in FIG. 1 of the drawings. The arrester 10 is shown schematically, since the housing and the individual internal components may be of conventional design. The arrester 10 is connected at one end to a power line 12, and at the other end to ground.

The internal components of the arrester 10 include a plurality of gap units 14 connected in series with a plurality of varistor valve block units, which for convenience are shown lumped together as a single varistor 16. A series circuit 18 of grading resistors 20 is connected between the power line 12 and ground and in parallel with the gap units 14 for grading the voltage at low frequencies. Also, a series circuit 22 of capacitors 24 is connected between the power line 12 and ground and in parallel with the gap units 14 for grading the voltage at high frequencies.

The gap units 14 include a number of control gap units 26 for triggering and cascading the initial sparkover of the arrester 10 on being subjected to an overvoltage, and a nember of cascade gap units 30.

While only several of the control gap units 26 and the cascade gap units 30 are shown for the arrester 10, it should be understood that for an arrester which is to be used at an operating voltage of for instance 168 KV, there would typically be a total number of about fourteen control gap units and about fourteen cascade gap units interspersed. The contol gap units 26 can be identified by a person of ordinary skilll in the art in that they are characterized by a substantially lower and more accurate characteristically sparkover voltage than that of any of the cascade gap units 30, which typically sparkover at a voltage of about half again the sparkover of the control gap units 26.

For the arrester 10 of the preferred embodiment the sparkover values for the control gap units 26, and the cascade gap units 30 are, respectively, 11.5 KV and 15.5 KV.

The grading resistors 20, which are non-linear, have a resistance determined by the number of gaps 14 used, so that the voltage is evenly divided across the gaps 14. The grading capacitors 24 have a capacitance of about 500 picofarads.

The linear upset resistor 32 of about 680 ohms is connected across at least the unit 34 of the control gap units 26 and in series with the capacitive grading circuit 22. The upset resistor 32 functions, in effect, to shorten the response of the control gap unit 34 for fast impulses, while leaving unaffected its sparkover voltage level for slow impulses. Thus for fast impulses the unit 34 necessarily is the first to sparkover and becomes the triggering control gap unit 34.

When the arrester 10 sees a slow impulse, such as a switching surge, the grading capacitors 24 pass an insignificant current, since they are frequency sensitive. This means that the voltage across the triggering control gap unit 34 is determined by the current in the resistive circuit 22 and will be equal to that across the other control gaps 26. If, on the other hand, the arrester 10 sees a fast impulse, such as a lightning surge, then the current through the capacitive grading circuit 22 dominates the voltage across the triggering control units 34. By locating the upset resistor 32 across the triggering control gap unit 34 in series with the capacitive grading circuit 22, the triggering control gap unit 34 can be made to see a higher voltage for fast impulses than it sees for the slow impulses, thus permitting it to retain a relatively uniform sparkover voltage, independent of the frequency of the initial impulse.

GENERAL CONSIDERATIONS

While in the arrester of the preferred embodiment the capacitive grading was by a single line of capacitors, the invention is also useful where there are two or more such lines across staggered sections of gaps. The upset resistor need not be connected solely across the triggering control gap unit, so long as it is connected in series with the capacitive grading in such a way that it does in fact dominate the voltage across the trigger gap at high frequencies.

While the present invention has thus far been described in terms of an arrester for relatively high voltages, it is conceivable that the invention could be used for an arrester of relatively low voltages also, if the sparkover of the one or more gaps in the arrester is desired to remain independent of the frequency of the impulses to which the arrester is subjected.

It is further advantageous for shortening the total response time of the arrester to fast impulses to connect an upset resistor in series with the capacitive grading line not only across a single one of the control gap units, but to connect such an upset resistor across some or all of the control gap units. This similarly shortens the response times of the other control gap units to the fast internal arrester impulse to which they are exposed upon the sparking over of the first control gap. The cascading of the arrester is thus improved.

For a particular arrester, the resistance value of the upset resistor should be chosen to give the optimum time constant for the speed of response desired. The sparkover turn-up for the gaps of an arrester varies with the stray capacitance to which the arrester is subjected.

The upset resistor of the arrester need not be precisely linear. However, it is desirable that the resistor have a low exponent. The term "exponent" as used herein refers to the value of the current-voltage characteristic exponent $n$ of the voltage in the current-voltage relationship for a resistor given by $i = KV^n$, where $I$ represents the current through the resistor, $K$ represents a constant, and $V$ represents the voltage across the resistor. The resistor should be substantially linear, and possibly even have its resistance increased with the voltage instead of decrease.

I claim:
1. A voltage surge arrester of the type having:
    a plurality of control gap units, having substantially equal sparkover voltages for slow voltage impulses;
    one or more varistor blocks connected in series with said gap units;
    a series line of voltage grading resistors connected in parallel with said gap units, and
    a series line of grading capacitor connected in parallel across successive individual units of said gap units,
 wherein the improvement comprises:
    at least one of said gap units also having individually connected in parallel with it, and in series with those of said capacitors associated with said gap unit, a resistor having a substantially linear current-voltage characteristic.
2. The arrester claimed in claim 1 and wherein the resistance value of said resistor is chosen so that the time constant of said resistance and said line of grading capacitors is about 0.25 microseconds.
3. The arrester claimed in claim 1 and including a plurality of control gap units having substantially equal sparkover for slow voltage impulses and a plurality of cascade gap units, all having a substantially higher sparkover voltage than said control gap unit, said resistor being in parallel with at least one of said control gap units.

* * * * *